(12) United States Patent
Hartmann (10) Patent No.: US 9,007,734 B2
(45) Date of Patent: Apr. 14, 2015

(54) METHOD AND SAFETY DEVICE FOR MONITORING A BUS BAR OF AN ELECTRICAL ENERGY SUPPLY GRID

(75) Inventor: Oliver Hartmann, Raleigh, NC (US)

(73) Assignee: Siemens Aktiengesellschaft, Munich (DE)

( * ) Notice: Subject to any disclaimer, the term of this patent is extended or adjusted under 35 U.S.C. 154(b) by 654 days.

(21) Appl. No.: 13/133,256

(22) PCT Filed: Dec. 10, 2008

(86) PCT No.: PCT/EP2008/010819
§ 371 (c)(1),
(2), (4) Date: Jun. 7, 2011

(87) PCT Pub. No.: WO2010/066279
PCT Pub. Date: Jun. 17, 2010

(65) Prior Publication Data
US 2011/0255202 A1    Oct. 20, 2011

(51) Int. Cl.
*H02H 3/02* (2006.01)
*H02H 7/26* (2006.01)

(52) U.S. Cl.
CPC .................................. *H02H 7/262* (2013.01)

(58) Field of Classification Search
CPC ........... H02H 7/261; H02H 3/08; H02H 7/22; H02H 3/02
USPC .......................................... 361/62–63, 64–69
See application file for complete search history.

(56) References Cited

U.S. PATENT DOCUMENTS

| 4,377,834 A | 3/1983 | Eriksson et al. |
| 5,513,061 A * | 4/1996 | Gelbien et al. .................. 361/63 |

(Continued)

FOREIGN PATENT DOCUMENTS

| CN | 1182298 A | 5/1998 |
| CN | 1405572 A | 3/2003 |

(Continued)

OTHER PUBLICATIONS

Siemens AG, "Efficient Energy Automation with the IEC 61850 Standard Application Examples", 2007, pp. 1-48, Germany, Found online at (http://www.energy.siemens.com/hq/pool/hq/energy-topics/standards/iec-61850/Application_examples_en.pdf).

(Continued)

*Primary Examiner* — Rexford Barnie
*Assistant Examiner* — Angela Brooks
(74) *Attorney, Agent, or Firm* — Laurence A. Greenberg; Werner H. Stemer; Ralph E. Locher (57) ABSTRACT

A method for monitoring a bus bar with regard to short circuits that may occur. The bus bar has a feeder and at least two outgoers. A outgoer safety device is provided at each outgoer and a feeder safety device is provided at the feeder. In the case of a short circuit in one of the outgoers, the outgoer safety device associated with the outgoer outputs a blocking signal to the feeder safety device, delaying or preventing actuation of a power switch disposed at the feeder. In order to provide a method wherein comparably little installation effort is required, the outgoer safety devices send repeating communication telegrams to the feeder safety device by way of a data transfer bus, and the feeder safety device checks the receipt of the communication telegrams by way of a checking logic, and optionally prevents the execution of a blocking signal. A feeder safety device is correspondingly configured.

12 Claims, 4 Drawing Sheets

(56) References Cited

U.S. PATENT DOCUMENTS

| | | | | |
|---|---|---|---|---|
| 5,892,645 | A | * | 4/1999 | Watanabe et al. ............... 361/85 |
| 5,905,615 | A | * | 5/1999 | Rivetti et al. .................... 361/63 |
| 6,369,995 | B1 | * | 4/2002 | Kagawa et al. ................. 361/62 |
| 6,496,342 | B1 | | 12/2002 | Horvath et al. |
| 6,904,549 | B2 | | 6/2005 | Jurisch et al. |
| 2004/0078710 | A1 | * | 4/2004 | Jurisch et al. ................... 714/43 |
| 2004/0130838 | A1 | * | 7/2004 | Papallo et al. .................. 361/62 |
| 2006/0114630 | A1 | * | 6/2006 | Culligan et al. ................. 361/62 |
| 2007/0242402 | A1 | * | 10/2007 | Papallo et al. .................. 361/63 |

FOREIGN PATENT DOCUMENTS

| | | |
|---|---|---|
| CN | 101179192 A | 5/2008 |
| EP | 0838887 B1 | 12/2002 |
| GB | 2010614 A | 6/1979 |
| RU | 2187871 C2 | 8/2002 |
| RU | 2333583 C1 | 4/2007 |
| WO | 0048284 A1 | 8/2000 |

OTHER PUBLICATIONS

Kimura, Sergio, et al., "Applying IEC 61820 to Real Life: Modernization Project for 30 Electrical Substations" XP002534710, Apr. 3, 2008, pp. 1-17, Found online at (http://www.energycentral.com/download/products/6308_Applying61850_RA_20080403.pdf).

Siemens AG, "SIPROTEC 7SJ600 Numerical Overcurrent, Motor and Overload Relay", 1997, pp. 1-27, Siemens, Germany, Found online at (http://www.wontex-power.com/download/7sj600_catalogue.pdf).

* cited by examiner

METHOD AND SAFETY DEVICE FOR MONITORING A BUS BAR OF AN ELECTRICAL ENERGY SUPPLY GRID

BACKGROUND OF THE INVENTION

Field of the Invention

The invention relates to a method for monitoring a busbar in an electrical power supply system for the occurrence of shorts, wherein the busbar has a feeder and at least two outgoers, an outgoer protective device is provided on each outgoer and monitors the respective outgoer for shorts, and a feeder protective device is provided on the feeder and monitors the busbar for shorts. In the event of a short in one of the outgoers, the outgoer protective device associated with this outgoer emits a blocking signal to the feeder protective device, which blocking signal delays or blocks tripping of a circuit breaker which is arranged on the feeder. The invention also relates to a corresponding feeder protective device, by means of which a method such as this can be carried out.

A protective device in which a method of the specified type is carried out is manufactured and marketed by Siemens AG, for example, under the name "Digitaler Überstromzeitschutz SIPROTEC 7SJ600" [SPIROTEC 7SJ600 digital overcurrent time protection].

In electrical power supply systems, busbars are used to distribute the electrical power between two or more outgoers. In this case, the busbars are themselves supplied with electrical power by means of at least one feeder. During operation of the electrical power supply system, the busbar must be monitored for the possible occurrence of shorts. Shorts such as these may occur on the busbar upstream of the outgoers, or on one of the outgoers. Electrical protective devices are normally provided for monitoring purposes on the feeder and on each outgoer and use electrical measurement variables (for example current and/or voltage measurement variables) to decide whether or not a short is present. If a short is present, then this must be overcome, that is to say disconnected, by opening suitable circuit breakers, which are normally arranged on the feeder and on each of the outgoers. While the outgoer protective devices can detect only those shorts which have occurred in their respective outgoer, the feeder protective device can identify shorts on the entire busbar, that is to say upstream of and on the individual outgoers, but in general cannot distinguish between them.

In order as far as possible to deliberately disconnect only the outgoer affected by the fault in the event of a short in an outgoer from the busbar, and not the entire busbar with all of the outgoers—an outgoer protective device which has detected a short in its outgoer normally emits a so-called "blocking signal" to the feeder protective device in order to prevent this from tripping a circuit breaker associated with the feeder to the busbar. This makes it possible to ensure that the short on the outgoer is specifically disconnected by the outgoer protective device associated with this outgoer, and not by the higher-level feeder protective device.

Shorts which occur on the busbar upstream of the outgoers are identified by the feeder protective device and are disconnected. In addition, the feeder protective device acts as a reserve protective device for the outgoer protective devices in the event of the short not being disconnected in the outgoer because of a malfunction either of an outgoer protective device or of a circuit breaker associated with the faulty outgoer. For this purpose, the feeder protective device can disconnect those shorts which are present over a relatively long time, independently of any blocking signal which may be present.

Until now, so-called "hard wiring" has usually been provided for transmission of the blocking signals from a respective outgoer protective device to the feeder protective device, that is to say a communication connection in which a signal output of each outgoer protective device is connected directly via a separate electrical line to a corresponding signal input of the feeder protective device. Although this configuration allows the serviceability of the individual lines to be monitored comparatively easily (for example by means of wire break identification), and faults which have occurred can easily be associated with a specific line, the hard wiring, particularly in the case of busbars with a large number of outgoers, results in a very high level of installation complexity, and therefore high costs.

BRIEF SUMMARY OF THE INVENTION

The object of the present invention is therefore to specify a method of the type mentioned initially and a corresponding protective device which allows reduced installation complexity, and therefore lower costs, with comparable safety against communication failures.

In order to achieve this object, a method of the type mentioned initially is proposed, in which the outgoer protective devices repeatedly send communication messages via a data transmission bus to the feeder protective device, the feeder protective device checks the reception of the communication messages, the feeder protective device classifies an outgoer protective device such as this as being faulty from which no communication messages are received within a defined time period, when communication messages have been received from at least one other outgoer protective device during the same time period, and if at least one outgoer protective device is classified as faulty, prevents the feeder protective device from implementing a blocking signal.

The invention is in this case first of all based on the idea of replacing the complex hard wiring between the individual outgoer protective devices and the feeder protective device by a data transmission bus. In order to ensure comparable safety against faults occurring on the data transmission bus, the feeder protective device or in the outgoer protective devices in a system such as this as well, the invention provides that the feeder protective device uses monitoring logic to monitor reception of the individual communication messages from the respective outgoer protective devices. A decision relating to the implementation of received blocking signals is made on the basis of the result of such monitoring. Specifically, if a defect in an individual outgoer protective device is identified from the lack of communication messages from this outgoer protective device, then the feeder protective device must also not be blocked in the event of a blocking signal from one of the other outgoer protective devices, since it is necessary to ensure that the short can be disconnected if it is in the outgoer with the defective protective device. However, because of the defect in the relevant outgoer protective device, this disconnection can now be carried out only by the feeder protective device.

In consequence, in the case of the method according to the invention, on the one hand the expensive and complex hard wiring is replaced by a data transmission bus which is simple to install and to operate, while on the other hand safety against defects and communication failures is in this case ensured by comparatively simple monitoring of the communication messages sent via the data transmission bus.

One advantageous embodiment of the method according to the invention provides that in the event of a short, and when at least one outgoer protective device has been classified as faulty, the feeder protective device trips the circuit breaker associated with the feeder only if the short is still present after a predetermined delay time has elapsed. This, so to speak, allows the outgoer protective device with the faulty outgoer to have a first chance to disconnect the short located on the outgoer, before the complete busbar is switched off via the feeder protective device.

The aim of this, inter alia, is to take account of the situation in which the defect in the outgoer protective device classified as faulty is not restricted to its protective function as such, but, for example, is restricted to the communication device via which the communication messages are output to the data transmission bus.

A further advantageous embodiment of the method according to the invention furthermore provides that the feeder protective device classifies its communication connection to the outgoer protective devices as faulty when no communication message is received within a defined time period. This advantageously means that, in the situation in which no more communication messages at all have been received by the feeder protective device, this does not classify all the outgoer protective devices as being defective, but assumes that there is a fault on its own communication connection to the outgoer protective devices.

In this context, it is considered to be advantageous if, when a communication connection is classified as faulty, the feeder protective device blocks tripping of the circuit breaker associated with the feeder. Since, in this case, this means that the feeder protective device is no longer able to receive blocking signals from the outgoer protective devices, it should first of all be assumed that the outgoer protective devices are operating correctly, as a result of which they are responsible for the disconnection of the shorts which have occurred in the outgoers.

In order nevertheless to allow a short which has occurred upstream of the outgoers on the busbar to be reliably disconnected or a defect in an outgoer protective device to be compensated for by the feeder protective device, it is furthermore proposed in this context that in the event of a short, and if a communication connection is classified as faulty, the feeder protective device trips the circuit breaker associated with the feeder if the short is still present after a predetermined waiting time has elapsed.

A further advantageous embodiment of the method according to the invention is provided by the communication messages being sent at regular intervals. The regular transmission of communication messages via the data transmission bus makes it possible in a particularly simple manner to identify whether expected communication messages have not been received from one, some or all of the outgoer protective devices.

According to a further advantageous embodiment of the method according to the invention, the communication messages can be sent as multicast messages via the data transmission bus. Multicast messages are sent from one sender to all of the receivers included in a receiver list for a communication system. There is therefore no need to specifically address a communication message to the feeder protective device, thus allowing the communication messages to be distributed easily and efficiently to a relatively large receiver group.

Furthermore, a further advantageous embodiment of the method according to the invention provides for the communication messages to contain information relating to the status of the respective outgoer protective device. In this case, the feeder protective device, the other outgoer protective devices and, if appropriate, further communication subscribers on the data transmission bus (for example controllers) can be informed very easily of the respective status of the individual outgoer protective device. By way of example, and inter alia, status information may include a message relating to the operating state of individual components of the outgoer protective device, or relating to a state of the circuit breaker associated with the outgoer, as well as measured values or messages relating to threshold value infringements.

Furthermore, a further advantageous embodiment of the method according to the invention provides for the communication messages of an outgoer protective device to comprise a blocking signal when the relevant outgoer protective device has identified a short in the outgoer associated with it. This allows the blocking signal to be transmitted particularly efficiently, since it is integrated in the communication messages which have to be sent in any case. In a situation such as this, it is advantageous for a communication message which comprises the blocking signal to be sent spontaneously, that is to say outside any regular clock cycle which may be provided, in the event of a status change, for example if a short is identified.

Specifically, so-called "GOOSE data messages" can be used as communication messages. These GOOSE data messages (GOOSE—Generic Object Oriented Substation Events), which are specified in IEC Standard 61850 from the International Electrotechnical Commission, are used in switchgear assemblies in corresponding Ethernet communication networks in order to interchange status messages particularly quickly and efficiently directly between individual appliances in the switchgear assembly.

The abovementioned object is also achieved by a feeder protective device for monitoring a busbar in an electrical power supply system for the occurrence of faults, wherein the feeder protective device comprises a communication device and a data processing device, wherein the communication device is designed to receive communication messages which are sent via a data transmission bus, from at least two outgoer protective devices, and the data processing device is designed to evaluate the reception of the communication messages such that, if no communication messages are received from only one or from some of the outgoer protective devices, blocking of tripping of a circuit breaker is prevented by means of a blocking signal which is received via the communication device.

According to a further advantageous embodiment of the feeder protective device according to the invention, the data processing device is furthermore designed to evaluate reception of the communication messages such that, when no communication messages are received from any of the outgoer protective devices, tripping of a circuit breaker is blocked.

BRIEF DESCRIPTION OF THE SEVERAL VIEWS OF THE DRAWING

The invention will be explained in more detail in the following text with reference to exemplary embodiments. In this context.

DESCRIPTION OF THE INVENTION

Figure 1:
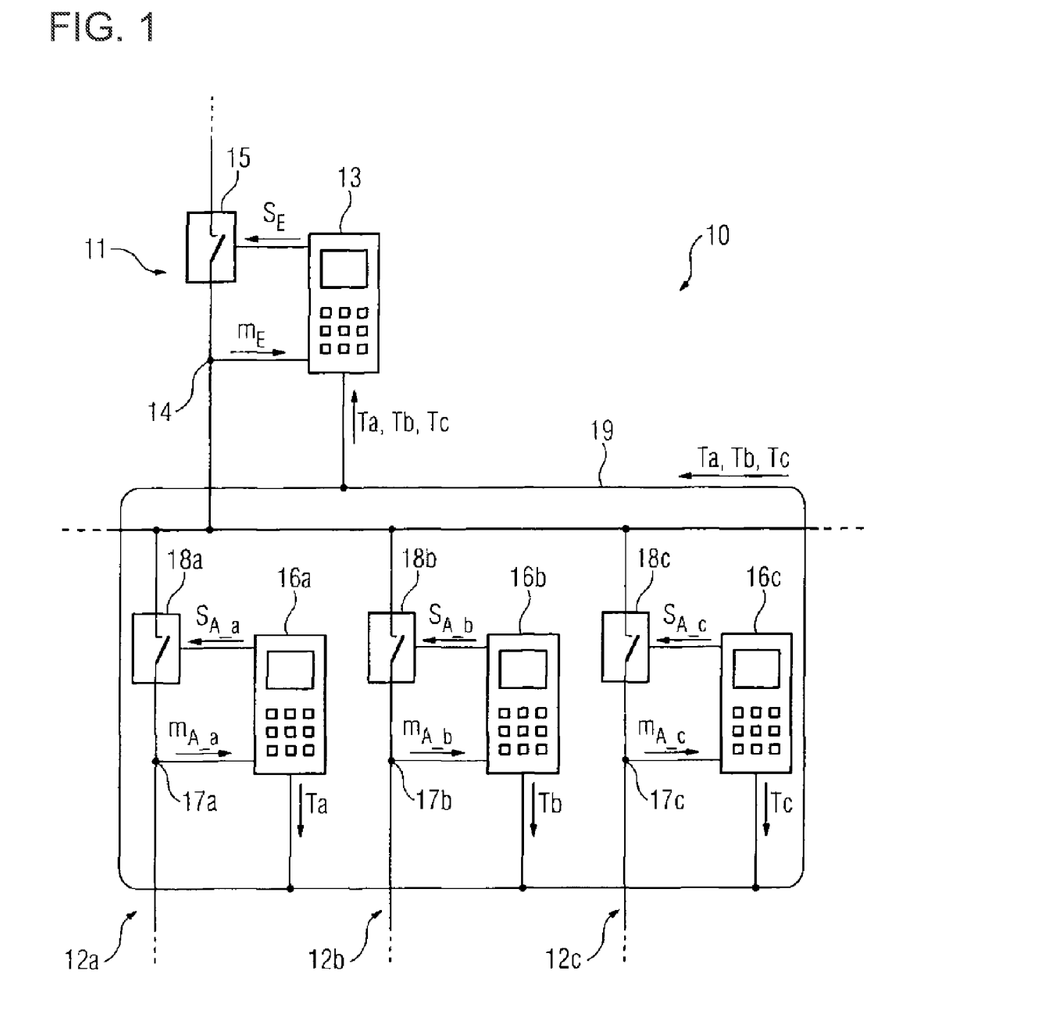
FIG. 1 shows a schematic illustration of a protection system for monitoring an electrical busbar for shorts.

FIG. 1 shows a busbar 10, which comprises a feeder 11 and outgoers 12a, 12b and 12c. On the feeder 11, a feeder protective device 13 receives measured values $m_E$ via an instrument transformer 14, which is illustrated only schematically, which measured values $m_E$ are suitable for describing the status of the busbar and for checking whether there is a short on the busbar. Measured values such as these may, for example, be current or voltage measured values. The feeder 11 furthermore has a circuit breaker 15, whose switching contacts can be opened via a tripping signal $S_E$ from the feeder protective device 13.

The outgoers 12a, 12b, 12c have respective outgoer protective devices 16a, 16b, 16c, which receive measured values $m_{A\_a}$, $M_{A\_b}$, $M_{A\_c}$, which describe the status of the respective outgoer 12a, 12b, 12c, via instrument transformers 17a, 17b and 17c which are illustrated only schematically, and use these measured values to decide whether there is a short on the respective outgoer 12a, 12b, 12c. If an outgoer protective device 16a, 16b, 16c such as this finds a short on its outgoer 12a, 12b, 12c, then it passes a respective tripping signal $S_{A\_a}$, $S_{A\_b}$, $S_{A\_c}$ to a circuit breaker 18a, 18b, 18c associated with the corresponding outgoer 12a, 12b, 12c, in order to cause this circuit breaker 18a, 18b, 18c to open its switching contacts, and thus to disconnect the outgoer 12a, 12b, 12c affected by the short.

The feeder protective device 13 and the outgoer protective devices 16a, 16b, 16c are connected via a data transmission bus 19, which is illustrated purely by way of example in the form of a ring structure in FIG. 1, and can interchange communication messages via this data transmission bus 19. For example, the individual outgoer protective devices 16a, 16b, 16c repeatedly send communication messages $T_a$, $T_b$ and $T_c$ via the data transmission bus 19, with the communication messages $T_a$, $T_b$ and $T_c$ being sent at least to the feeder protective device 13. The feeder protective device 13 receives the communication messages $T_a$, $T_b$ and $T_c$.

By way of example, the communication messages $T_a$, $T_b$ and $T_c$ may contain status information relating to the individual outgoer protective devices 16a, 16b, 16c. Furthermore, the communication messages $T_a$, $T_b$ and $T_c$ may also comprise blocking signals B. Alternatively, the blocking signals B may also be transmitted separately. By way of example, the communication messages may be so-called "GOOSE data messages", which are specified in IEC Standard 61850 for communication in switchgear assemblies. In this case, the communication messages may be sent as multicast messages, that is to say sent at the same time to a plurality of receivers.

If a short occurs on the busbar 10, this should be disconnected as far as possible by that protective device which is directly associated with the location where the fault has occurred. For example, shorts which occur upstream of the outgoers 12a, 12b, 12c on the busbar must be disconnected by the feeder protective device 13 by means of the circuit breaker 15. Since the complete busbar is switched off in this case, all of the outgoers 12a, 12b, 12c which originate from the busbar are affected by the disconnection. Shorts which occur on the outgoers should in contrast be disconnected by the respective protective device associated with the outgoer, via the corresponding circuit breaker. For example, a short on the outgoer 12a should be disconnected by the outgoer protective device 16a via the circuit breaker 18a.

The feeder protective device 13 also acts as a reserve protective device for the situation in which one of the outgoer protective devices 16a, 16b, 16c does not identify a short on its outgoer 12a, 12b, 12c, or cannot disconnect this because of a defect.

For the situation in which one of the outgoer protective devices 16a, 16b, 16c identifies a short on its outgoer 12a, 12b, 12c, it sends via the data transmission bus 19 a blocking signal B which, for example, may be contained in a communication message $T_a$, $T_b$ and $T_c$. This blocking signal B causes the feeder protective device 13 to block the tripping of its circuit breaker 15, that is to say to prevent the tripping signal $S_E$ from being emitted to the circuit breaker 15. The relevant outgoer protective device 16a, 16b, 16c at the same time disconnects the faulty outgoer 12a, 12b, 12c via its respective circuit breaker 18a, 18b, 18c, and thus overcomes the short. However, if the short is not overcome in good time, for example because the appropriate outgoer protective device or the circuit breaker is defective, then the feeder protective device 13 can also trip its circuit breaker as a reserve protective device when a blocking signal B is present, provided that the short is still present after a specific time period has elapsed.

In the protection system shown in FIG. 1, major importance is associated with a functional communication transmission between the outgoer protective devices 12a, 12b, 12c and the feeder protective device 13, since correct functionality of the protection system is ensured only if the blocking signals B are received correctly. Provision is therefore made for a data processing device in the feeder protective device 13 to carry out monitoring logic for monitoring correct communication on the data transmission bus 19, and this will be explained in more detail in the following text with reference to FIGS. 2 to 4.

Figure 2:
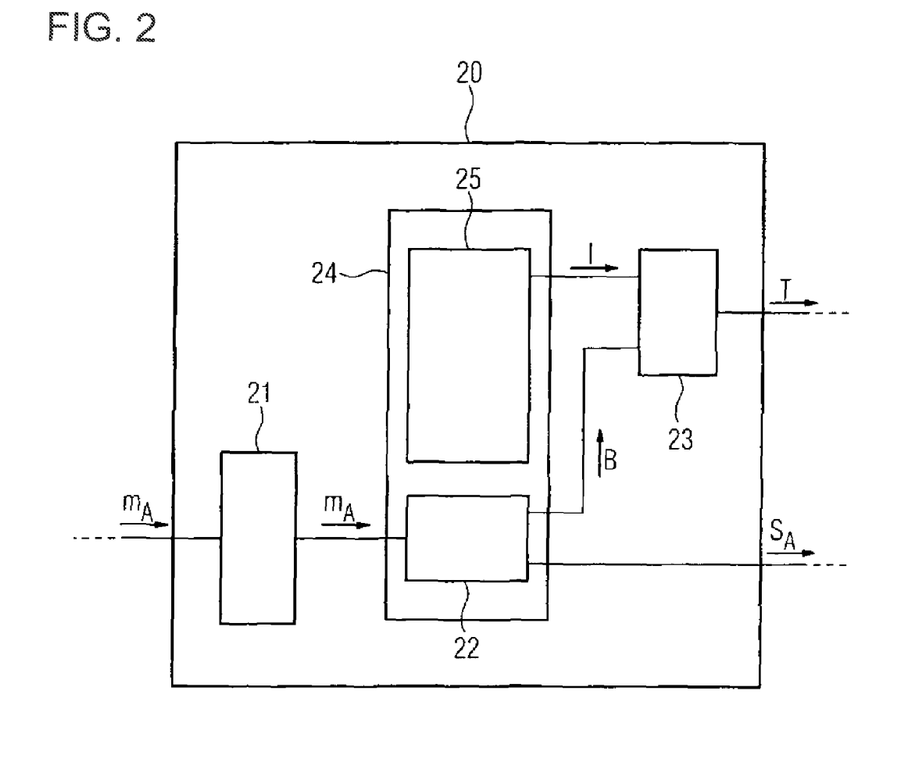
FIG. 2 shows a schematic block diagram illustration of one exemplary embodiment of an outgoer protective device.

First of all, FIG. 2 shows one exemplary embodiment of an outgoer protective device 20. The outgoer protective device 20 receives measured values $m_A$ from the corresponding outgoer via a measured value detection device 21, and supplies them to a data processing device 24. The data processing device 24 comprises an evaluation device 22, which evaluates the measured values $m_A$ in order to check for shorts which are present on the outgoer. The evaluation device 22 for this purpose runs so-called protection algorithms which, for example, may be an overcurrent time protection algorithm or a distance protection algorithm. Protection algorithms such as these are familiar to those skilled in the art and familiar with the monitoring of electrical power supply systems, and will therefore not be described in any more detail at this point. All that will be stated is that the use of the respective protection algorithm makes it possible for the outgoer protective device to identify whether or not there is a short on the outgoer being monitored by it.

If the evaluation device 22 for the outgoer protective device 20 identifies a short on the outgoer associated with it, then it sends a tripping signal $S_A$ to a circuit breaker which is associated with the relevant outgoer, in order to cause this to open its switching contacts, and thus to switch off the faulty outgoer. At the same time, it sends a blocking signal B to a communication device 23. The communication device 23 emits the blocking signal B either in its own right or as part of a communication message T to a connected data transmission bus. In the description relating to FIGS. 2 to 4, it will simply be assumed, by way of example, that the blocking signal B is transmitted as a component of a communication message T. In this case, a communication message can be transmitted spontaneously with a blocking signal B, that is to say independently of a regular transmission clock cycle of the communication messages, immediately after identification of a short.

The data processing device 24 for the outgoer protective device 20 may furthermore detect further status information relating to the outgoer protective device 20, via an extended evaluation device 25, and may emit this as an information signal I to the communication device 23. The communication device 23 also integrates the information signals I in the communication messages T, and emits them to the data transmission bus.

Figure 3:
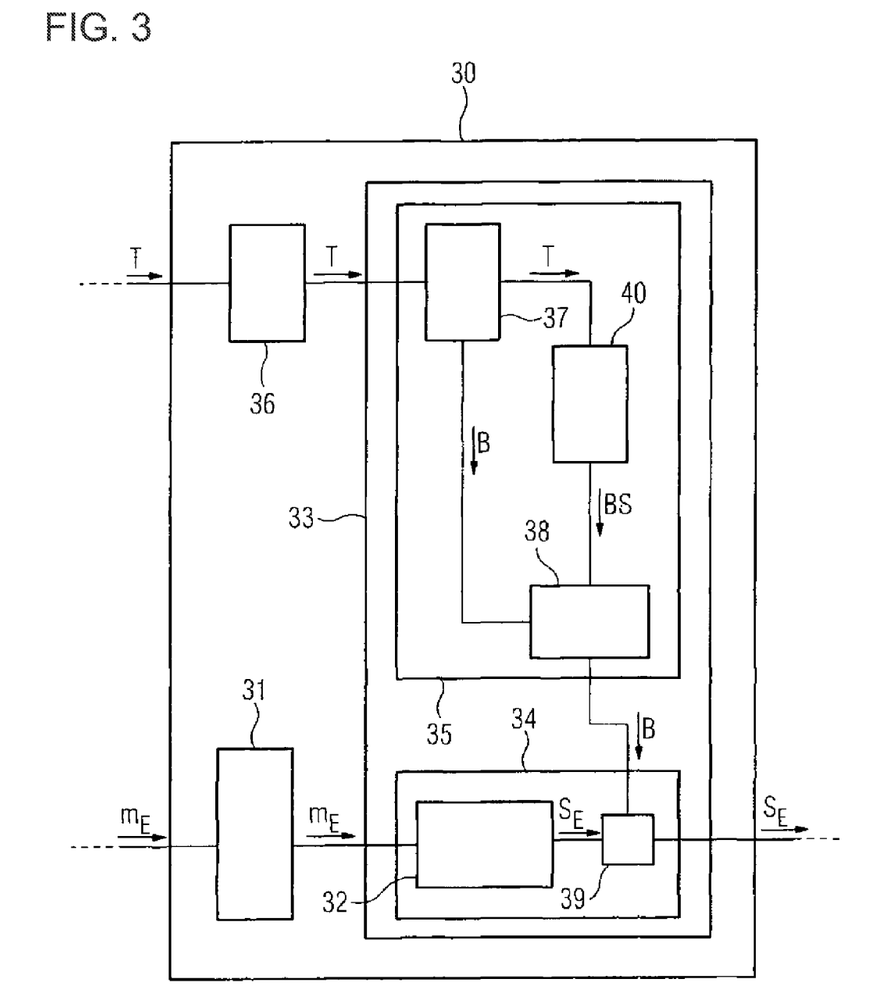
FIG. 3 shows a schematic block diagram illustration of a first exemplary embodiment of a feeder protective device.

FIG. 3 shows a first exemplary embodiment of a feeder protective device 30. The feeder protective device 30 receives measured values $m_E$ on the feeder via a measured value detection device 31, and transfers them to a data processing device 33. The data processing device 33 comprises a short-circuit monitoring unit 34 and a communication monitoring unit 35.

One major component of the short-circuit monitoring device 34 is an evaluation device 32, which evaluates the measured values $m_E$ by running appropriate protection algorithms, such as an overcurrent time protection algorithm or a distance protection algorithm, in order to identify a short on the busbar. In this case, initially, the evaluation device 32 cannot distinguish whether an identified short is a short on the busbar upstream of the outgoers, or a short on one of the outgoers. When the evaluation device 32 identifies a short, then it emits a tripping signal $S_E$ on the output side.

Furthermore, the feeder protective device 30 receives data messages T via a communication device 36, and transmits them to the communication monitoring unit 35 of the data processing device 33. The communication monitoring unit 35 comprises an analysis device 37 which checks whether one of the communication messages received by the communication device 36 comprises a blocking signal B and, if appropriate, sends this to a blocking device 38.

When the blocking device 38 receives a blocking signal B, it emits this to a suppression device 39 which, when a blocking signal B is present, itself prevents the tripping signal $S_E$ from being passed on. In this way, when an outgoer protective device identifies a short on its outgoer, this ensures that the feeder protective device uses the blocking signal B to prevent its own circuit breaker from tripping. In consequence, the short is disconnected by the appropriate outgoer protective device without having to switch off the complete busbar.

Furthermore, the communication monitoring unit 35 comprises a first test device 40, which checks the reception of the communication messages T to determine whether the expected communication messages have been received regularly from each outgoer protective device.

If the first test device 40 identifies that there have been none of the expected communication messages from an outgoer protective device for a predetermined time period, while the expected communication messages have been received from at least one further outgoer protective device, then it emits a blocking inhibit signal BS to the blocking device 38, which prevents any blocking signal B which may be present from being passed on in the blocking device 38. This ensures that, in the situation in which one of the outgoer protective devices is defective and can therefore no longer send any communication messages to the feeder protective device, a short occurring on the relevant outgoer will in any case be disconnected by the feeder protective device. This is because, in the situation in which at least one of the outgoer protective devices has been identified as being faulty, the protection system changes, so to speak, to a safe mode, in which every short is now disconnected only via the feeder protective device. A blocking signal sent from another outgoer protective device must therefore no longer have any blocking effect on the feeder protective device.

Figure 4:
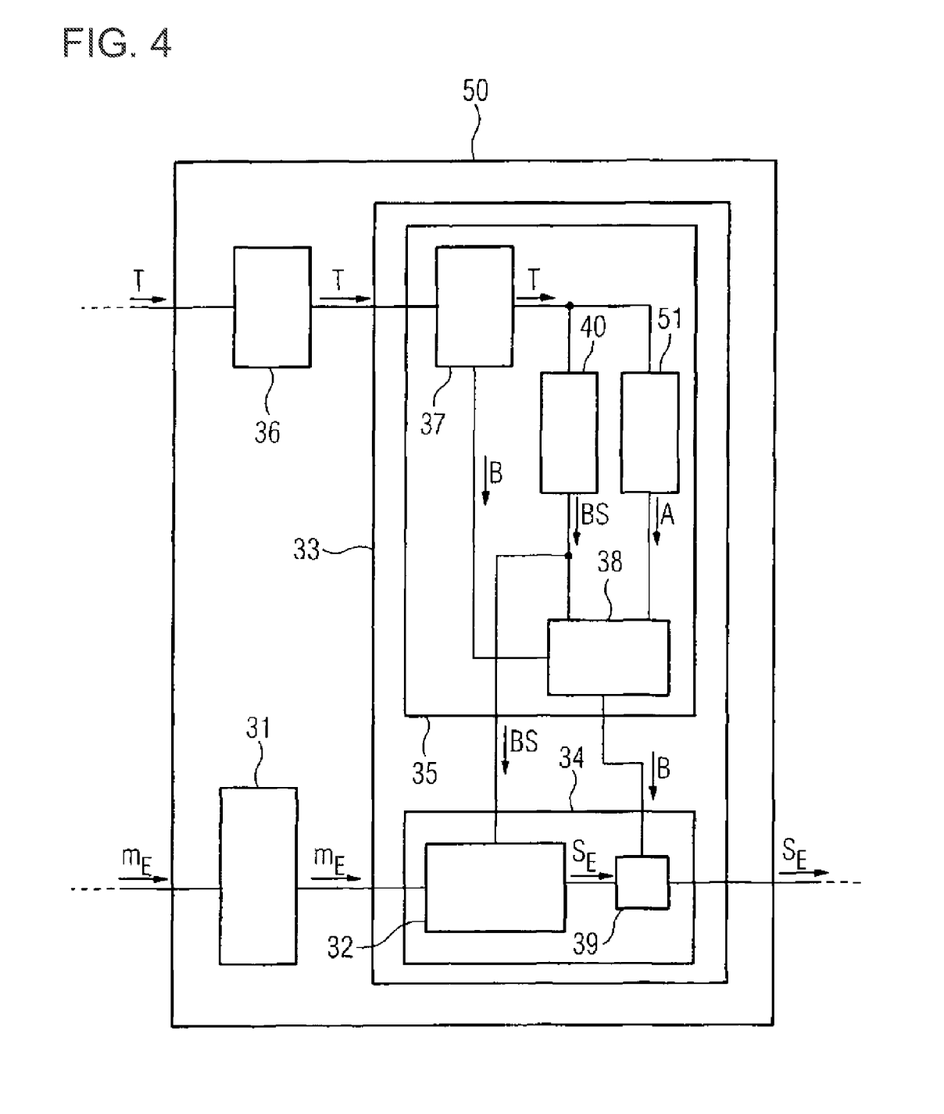
FIG. 4 shows a schematic block diagram illustration of a second exemplary embodiment of a feeder protective device.

Finally, FIG. 4 shows a second exemplary embodiment of a feeder protective device 50, large parts of which correspond to those of the feeder protective device 30 according to the first exemplary embodiment, as shown in FIG. 3. Therefore, corresponding components are identified by the same reference symbols, and will not be explained again in detail with reference to FIG. 4. The following text now explains only those functionalities which are additional in the feeder protective device 50 according to the second exemplary embodiment shown in FIG. 4.

In the case of the feeder protective device 50, the blocking inhibit signal BS is additionally transmitted to the evaluation device 32 as well, and causes it to emit the tripping signal $S_E$ only after a certain delay time has elapsed, provided that the short is still present after the delay time has elapsed. The aim of this is to ensure that, in the situation in which an outgoer protective device has been identified as being faulty due to there being no communication messages T from it, this fault does not relate to a protection function of the outgoer protective device, however, but is restricted to its communication device would nevertheless be able to overcome the short on its outgoer, as a result of which, the fact that the feeder protective device waits for the delay time means that the relevant outgoer protective device can itself overcome the short. This makes it possible to prevent the entire busbar from being switched off.

Furthermore, the feeder protective device 50 as shown in FIG. 4 has a further test device 51 which checks whether any communication messages T at all are still being received by the communication device 36 of the feeder protective device 50. This is because, in a situation such as this, it can be assumed that the communication connection of the feeder protective device itself is faulty, for example as a result of a defective communication switch in the data transmission bus, preventing communication messages T from being transmitted from all of the outgoer protective devices to the feeder protective device. In a situation such as this, the test device 51 emits an activation signal A to the blocking device 38, which causes a blocking signal B to be emitted to the suppression device 39, independently of the presence of such a blocking signal B. The aim of this is to prevent tripping of the circuit breaker on the feeder since, in the case of a faulty communication connection such as this, the outgoer protective devices—which are initially assumed to be operating correctly—shall be given the opportunity to overcome a short on one of the outgoers itself.

In order to improve the protection safety, the test device 51 can optionally also emit the activation signal A only until a specific waiting time has elapsed, and can then end the emission of the activation signal A in order that the tripping signal SE can be emitted to the circuit breaker for the feeder in the situation in which the short is still identified by the evaluation device 32 even after the waiting time has elapsed. The aim of this is on the one hand to allow safe tripping of the circuit breaker on the feeder for the situation in which one of the outgoer protective devices is defective or it has not been possible to successfully carry out its disconnection process. On the other hand, this ensures that a short can be disconnected which has not occurred on one of the outgoers, but on the busbar upstream of the outgoers.

If one of the test devices 40 or 51 finds a communication fault, then this should initiate the emission of a warning message, which is either indicated directly on the feeder protective device or is transmitted to a monitoring appliance which is superordinate to the feeder protective device, for example a system control center, in order to indicate to the operator of the electrical power supply system that a fault has occurred in the communication functionality of the protection system.

Although the exemplary embodiments described in FIGS. 2 to 4 have been explained with reference to block diagrams, the corresponding functions are normally implemented by software in the protective devices, which software is run on a data processing device for an appropriate protective device. The explanation on the basis of the functional blocks is therefore intended only to assist understanding, but not to restrict the invention.

The invention claimed is:

1. A method for monitoring a busbar in an electrical power supply system for an occurrence of short circuits, wherein:
   the busbar has a feeder and at least two outgoers;
   an outgoer protective device is provided on each outgoer for monitoring the respective outgoer for shorts; and
   a feeder protective device is provided on the feeder for monitoring the busbar for shorts; and
   the method which comprises:
   on occurrence of a short in one of the outgoers, transmitting a blocking signal from the outgoer protective device associated with the respective outgoer to the feeder protective device, the blocking signal delaying or blocking a tripping of a circuit breaker connected on the feeder;
   repeatedly sending communication messages via a data transmission bus from the outgoer protective devices to the feeder protective device;
   checking a reception of the communication messages with the feeder protective device;
   with the feeder protective device, classifying an outgoer protective device as being faulty from which no communication messages are received within a defined time period, while communication messages have been received from at least one other outgoer protective device during the defined time period; and
   if at least one outgoer protective device is classified as faulty, preventing an issuance of the blocking signal with the feeder protective device.

2. The method according to claim 1, wherein, in the event of a short, and when at least one outgoer protective device has been classified as faulty, the feeder protective device tripping the circuit breaker associated with the feeder only if the short is still present after a predetermined delay time has elapsed.

3. The method according to claim 1, which comprises classifying a communication connection from a feeder protective device to the outgoer protective devices as faulty when no communication message is received within a defined time period.

4. The method according to claim 3, when a communication connection is classified as faulty, blocking with the feeder protective device a tripping of the circuit breaker associated with the feeder.

5. The method according to claim 4, which comprises, in the event of a short, and if a communication connection is classified as faulty, tripping with the feeder protective device the circuit breaker associated with the respective feeder if the short is still present after a predetermined waiting time has elapsed.

6. The method according to claim 1, which comprises sending the communication messages at regular time intervals.

7. The method according to claim 1, which comprises sending the communication messages as multicast messages via the data transmission bus.

8. The method according to claim 1, wherein the communication messages contain information relating to the status of the respective outgoer protective device.

9. The method according to claim 1, wherein the communication messages from an outgoer protective device comprise a blocking signal when the relevant outgoer protective device has identified a short in the outgoer associated with it.

10. The method according to claim 1, wherein the communication messages are GOOSE data messages.

11. A feeder protective device for monitoring a busbar in an electrical power supply system for an occurrence of shorts, the feeder protective device comprising:
    a communication device configured for receiving communication messages that are sent via a data transmission bus from at least two outgoer protective devices; and
    a data processing device connected to said communication device, said data processing device being configured to evaluate a reception of the communication messages and, if no communication messages are received from only one or from some of the outgoer protective devices, preventing a blocking of the tripping of a circuit breaker by way of a blocking signal received via the communication device.

12. The feeder protective device according to claim 11, wherein said data processing device is configured to evaluate the reception of the communication messages such that, when no communication messages are received from any of the outgoer protective devices, blocking a tripping of a circuit breaker.

* * * * *